United States Patent [19]

Okuda et al.

[11] Patent Number: 5,002,996
[45] Date of Patent: Mar. 26, 1991

[54] FLAME RETARDANT OLEFINIC RESIN COMPOSITION

[75] Inventors: Nobuaki Okuda, Takarazuka; Yasuo Nakagawa, Nishinomiya, both of Japan

[73] Assignee: Sumitomo Bakelite Company Limited, Tokyo, Japan

[21] Appl. No.: 319,196

[22] Filed: Mar. 6, 1989

[30] Foreign Application Priority Data

Mar. 24, 1988 [JP] Japan .................................. 63-68238
Apr. 4, 1988 [JP] Japan .................................. 63-81189
Apr. 4, 1988 [JP] Japan .................................. 63-81190

[51] Int. Cl.$^5$ ............................................. C08K 3/22
[52] U.S. Cl. ..................................... 524/436; 524/413; 524/424; 524/427; 524/430; 524/437
[58] Field of Search ............... 524/436, 437, 413, 427, 524/424, 430, 405; 525/71, 72, 106, 101

[56] References Cited

U.S. PATENT DOCUMENTS 4,328,323  5/1982  Keogh .................................. 525/106
4,722,959  2/1988  Inoue et al. ......................... 524/412
4,732,939  3/1988  Hoshi et al. ......................... 525/106
4,801,639  1/1989  Hoshi et al. ......................... 524/437
4,845,146  7/1989  Inoue et al. ......................... 524/437

Primary Examiner—Veronica P. Hoke
Attorney, Agent, or Firm—Browdy and Neimark

[57] ABSTRACT

A flame-retardant olefinic resin composition comprising
(a) at least one ethylene copolymer selected from the group consisting of ethylene-α-olefin copolymers, ethylene-ethyl acrylate copolymer and ethylene-methyl methacrylate copolymer,
(b) a silane-grafted polymer obtained by grafting a silane to an olefinic resin,
(c) a maleic acid or maleic anhydride derivative of a polyethylene, an ethylene-vinyl acetate copolymer or an ethylene-α-olefin copolymer,
(d) (i) an ethylene-ethyl acrylate-maleic anhydride copolymer or an ethylene-methyl methacrylate-maleic anhydride copolymer, or (d) (ii) a silicone-modified polymer obtained by graft-polymerizing a reactive polyorganosiloxane to a thermoplastic resin, or (d) (iii) a mixture of (d) (i) and (d) (ii).

13 Claims, No Drawings

FLAME RETARDANT OLEFINIC RESIN COMPOSITION

The present invention relates to flame-retardant olefinic resin compositions which generate no hazardous and corrosive gas of halogen type during burning due to fire outbreak and which are intended to be applied particularly to electric wires and cables.

Imparting flame retardancy to polyolefin compositions which have been extensively used as an insulating material for electric wires, cables and electric appliances, has conventionally been achieved by adding a halogen compound and antimony trioxide to a polyolefin. However, the resulting compositions contain a halogen, and therefore generate, during burning, a halide gas which is harmful to the human body and corrodes metals. Moreover, these compositions produce, during burning, a large amount of fume making the visibility poor. This has imposed a remarkable restriction with respect to evacuation of people and fire fighting activity during fire.

Hence, it has recently become a strong desire from a safety standpoint that these resin compositions produce no halogen-based gas upon burning. Under such situation, hydrated metal compounds have come to draw attention as an inorganic flame retardant, because their fuming property and harmfulness are very low.

Resin compositions containing a large amount of magnesium hydroxide, aluminum hydroxide or the like for improving flame retardancy have been used in recent years. However, these resin compositions have the following drawbacks.

(1) Magnesium hydroxide reacts with the moisture and carbon dioxide present in the air and changes to magnesium carbonate. Accordingly, on the surface of a resin composition containing magnesium hydroxide, there appear white crystals of magnesium carbonate.

(2) Magnesium hydroxide and aluminum hydroxide have very low resistances to acids and alkalis. Therefore, when a resin composition containing magnesium hydroxide or aluminum hydroxide is in contact with an acid or an alkali, magnesium hydroxide or aluminum hydroxide readily dissolves in the acid or alkali at the surface of the resin composition. It dissolves in a large amount even in a weak acid having a pH of about 2 and, as a result, is liable to cause the deterioration of the resin composition surface (3) The presence of a large amount of an inorganic filler in a resin composition easily incurs the surface damaging of the resin composition.

(4) A resin composition containing magnesium hydroxide, aluminum hydroxide or the like causes surface whitening when bended, or buckling.

These drawbacks have delayed the practical applications of the resin compositions containing magnesium hydroxide, aluminum hydroxide or the like to electric wires and cables.

In connection with the present invention, Japanese Patent Application Nos. 129064/1986 and 138316/1986 state as follows: A silane-grafted polymer causes crosslinking without requiring any catalyst. More specifically, hydroxyl groups (—OH) on the surface of a hydrated metal compound and silanol groups ($\rightarrow$Si—OH) of a silane-grafted polymer cause a hydrolytic condensation reaction to form strong siloxane linkages [—Si—O—$M_mO_n$ (M is a metal)], under the influences of (a) a small amount of water present on the surface of the hydrated metal compound and (b) the hydrated metal compound which acts similarly to an organic metal compound catalyst and in the presence of frictional heat generated during kneading; in this reaction, no catalyst is required.

The above two patent applications further state that said strong siloxane linkages are effective in providing a resin composition with excellent shape retention at high temperatures, improved drip prevention during burning and improved mechanical properties (e.g. improved whitening on bending, and improved wear resistance).

The above patent applications also state in the Examples that the strong siloxane linkages bring about improvements in mechanical properties, surface properties, thermal properties including heat deformation, and burning properties including oxygen index.

There have conventionally been proposed unsaturated dicarboxylic acid-modified polymers obtained by reacting maleic anhydride with polyethylene, polypropylene, ethylene-vinyl acetate copolymer (hereinafter referred to as EVA), ethylene-ethyl acrylate copolymer (hereinafter referred to as EEA), ethylene-$\alpha$-olefin copolymers, or a liquid hydrocarbon polymer (e.g. a liquid polybutadiene) as a polymer skeleton in the presence of a radical-generating agent such as a peroxide. These resins are being marketed in Japan in large amounts. The addition of such a modified olefinic resin for imparting an adhesive property to other resins and metal powders has been reported in many papers. On this point, a number of patent applications have been filed. The examples are Japanese Patent Publication Nos. 5788/1987 and 9135/1987.

As another example of maleic anhydride utilization, maleic anhydride is subjected to addition reaction to ethylene-$\alpha$-olefin copolymers in the presence of a peroxide or the like to improve the latter's heat resistance and mechanical strength, as described in Japanese Patent Application Kokai (Laid-Open) Nos. 10151/1987 and 11745/1987. In this approach, the polar group of maleic anhydride is added to a non-polar olefinic resin to merely improve the latter's affinity with a filler and to finally improve the mechanical strength and heat resistance of the latter. Therefore, the purpose of this approach is different from that of an approach intended by the present invention wherein siloxane linkages are formed between a silane-grafted polymer and a hydrated metal compound through the water present on the surface of the hydrated metal compound and furthermore complex salt linkages are formed by the reaction between the hydrated metal compound and a dicarboxylic acid anhydride derivative.

In order to solve the above mentioned problems, the present inventors proposed in Japanese Patent Application No. 45200/1987 a falme-retardant olefinic resin composition comprising an olefinic resin, a silane-grafted polymer (a silane-grafted olefinic resin), a hydrated metal compound and a dicarboxylic acid or dicarboxylic anhydride derivative. The present invention provides a flame-retardant resin composition which contains a hydrated metal compound as an effective flame retardant but in which the surface deterioration and very low chemical resistance caused by the incorporation of the hydrated metal compound during various environmental tests or actual usage are prevented and thereby the surface damaging and the surface whitening on bending and buckling are improved furthermore.

The present invention resides in a flame-retardant olefinic resin composition comprising (a) at least one ethylene copolymer selected from the group consisting of ethylene-α-olefin copolymers, ethylene-ethyl acrylate copolymer and ethylene-methyl methacrylate copolymer, (b) a silane-grafted polymer obtained by grafting a silane to an olefinic resin, (c) a maleic acid or maleic anhydride derivative of a polyethylene, an ethylene-vinyl acetate copolymer or an ethylene-α-olefin copolymer, (d) (i) an ethylene-ethyl acrylate-maleic anhydride copolymer or an ethylene-methyl methacrylate-maleic anhydride copolymer, or (d)(ii) a silicone-modified polymer obtained by graft-polymerizing a reactive polyorganosiloxane to a thermoplastic resin, or (d)(iii) a mixture of (d)(i) and (d)(ii), and (e) a hydrated metal compound, wherein there are incorporated the component (c) in an amount of 0.1–30 parts by weight, the component (d)(i) in an amount of 0.1–30 parts by weight when used, the component (d)(ii) in an amount of 0.1–30 parts by weight when used, and the component (e) in an amount of 50–300 parts by weight, all based on 100 parts by weight of the components (a) and (b).

In the present invention, the olefinic resin to which a silane is to be grafted, includes low density polyethylene, medium density polyethylene, high density polyethylene, ethylene-α-olefin copolymers, EVA, EEA, EMMA, ethylene-propylene rubber, ethylene-propylenediene rubbers, etc.

As the α-olefin of the ethylene-α-olefin copolymers used in the components (a), (b) and (c), there can be cited those having 3–12 carbon atoms, such as propylene, butene-1, pentene-1, hexene-1, heptene-1, octene-1, 4-methylpentene-1, 4-methylhexene-1, 4,4dimethylpentene-1, nonene-1, decene-1, undecene-1, dodecene-1 and the like. Of these α-olefins, particularly preferable are butene-1, pentene-1, hexene-1, heptene-1 and 4-methylpentene-1.

The silane-grafted polymer used in the present invention is obtained by reacting the above mentioned olefinic resin with an organic silane represented by the general formula $RR'SiY_2$ (R is a monovalent olefinically unsaturated hydrocarbon group; Y is a hydrolyzable organic group; and R' is a monovalent hydrocarbon group other than unsaturated aliphatic hydrocarbon groups or is same as Y) in the presence of a free-radical-generating compound. This reaction is conducted according to a known method described in Japanese Patent Publication No. 24373/1982, Japanese Patent Publication No. 1711/1973, Japanese Patent Application Kokai (Laid-Open) No. 24342/1975, etc. In a specific example, a polyolefin resin is reacted with vinyltrimethoxysilane in the presence of an organic peroxide [e.g. DCP (dicumyl peroxide)] having a strong polymerization-initiating action, whereby a silane-grafted polymer is obtained The amount of the silane-grafted polymer used is preferably at least 2 parts by weight per 100 parts by weight of the components (a) and (b).

When the amount is less than 2 parts by weight, the resulting resin composition shows little improvements in shape retention at high temperatures and drip prevention during burning.

The crosslinking degree of the silane-grafted polymer is preferably 20–80% by weight in terms of a gel fraction which is defined as a xylene insoluble. When the gel fraction is less than 20% by weight, the resulting resin composition is low in shape retention at high temperatures and drip prevention during burning. When the gel fraction is more than 80% by weight, the resulting resin composition has poor moldability.

The amount of the maleic acid or maleic anhydride derivative of a polyethylene, an EVA or an ethylene-α-olefin copolymer is 0.1–30 parts by weight based on 100 parts by weight of the components (a) and (b). When the amount is less than 0.1 part by weight, the addition effect is very low. When the amount is more than 30 parts by weight, the reaction between the derivative and the hydrated metal compound takes place excessively and the composition shows poor extrudability and the extrudate shows deteriorated appearance.

When there is used a component (d)(i), namely, an ethylene-ethyl acrylate-maleic anhydride copolymer or an ethylene-methyl methacrylate-maleic anhydride copolymer, the amount is 0.1–30 parts by weight based on 100 parts by weight of the components (a) and (b). When the amount is less than 0.1 part by weight, the addition effect is very low. When the amount is more than 30 parts by weight, the composition shows poor extrudability and poor heat aging property In the present invention, the thermoplastic resin to which a reactive polyorganosiloxane is to be graft-polymerized, includes polyolefin resins such as polyethylene, polypropylene, ethylene-α-olefin copolymers, EVA, EEA, EMMA and the like; polystyrene; and acrylonitrile-butadiene-styrene copolymer.

When there is used a component (d)(ii), namely, a silane-modified polymer obtained by graft-polymerizing a reactive polyorganosiloxane to the above thermoplastic resin, the amount is 0.1–30 parts by weight based on 100 parts by weight of the components (a) and (b). When the amount is less than 0.1 part by weight, the addition effect is very low. When the amount is more than 30 parts by weight, no corresponding improvement in effect is obtained and the composition cost is higher, which is not practical.

The hydrated metal compound used in the present invention is a compound having a decompositionstarting temperature of 150°–450° C. and represented by the general formula $M_mO_n.XH_2O$ (M is a metal; m and n are each an integer of 1 or more determined by the valency of the metal; and X is the number of molecules of bound water) or a double salt containing said compound. Specific examples of the hydrated metal compound are aluminum hydroxide [$Al_2O_3.3H_2O$ or $Al(OH)_3$], magnesium hydroxide [$MgO.H_2O$ or $Mg(OH)_2$], calcium hydroxide [$CaO.H_2O$ or $Ca(OH)_2$], barium hydroxide [$BaO.H_2O$ or $BaO.9H_2O$], zirconium oxide hydrate ($ZrO.nH_2O$), tin oxide hydrate ($SnO.H_2O$), basic magnesium carbonate [$3MgCO_3.Mg(OH)_2.3H_2O$], hydrotalcite ($6MgO.Al_2O_3.H_2O$), dawsonite ($Na_2CO_3.Al_2O_3.nH_2O$), borax ($Na_2O.B_2O_6.5H_2O$)) and zinc borate ($ZnB_4O_7.2H_2O$). hydrated metal compound is added in an amount of 50–300 parts by weight based on 100 parts by weight of the components (a) and (b). When the amount is less than 50 parts by weight, the resulting resin composition is difficult to have desired flame retardancy. When the amount is more than 300 parts by weight, the resulting resin composition shows low mechanical properties (e.g. low tensile strength) and poor extrudability.

The flame-retardant olefinic resin composition of the present invention can further contain, if desired, various additives conventionally used, such as antioxidant, neutralizing agent, UV absorber, antistatic agent, pigment, dispersing agent, lubricant, thickener, foaming agent, metal deterioration inhibitor, fungicide, flow control agent, flame retardant of phosphorus or phosphine derivative type, other inorganic fillers, crosslinking agent, crosslinking aid and the like and furthermore other synthetic resins. The present composition can be subjected to crosslinking by electron rays.

In producing the present resin composition comprising (a) at least one ethylene copolymer selected from the group consisting of ethylene-α-olefin copolymers, ethylene-ethyl acrylate copolymer and ethylene-methyl methacrylate copolymer, (b) a silane-grafted polymer obtained by grafting a silane to an olefinic resin, (c) a maleic acid or maleic anhydride derivative of a polyethylene, an ethylene-vinyl acetate copolymer or an ethylene-α-olefin copolymer, (d) (i) an ethylene-ethyl acrylate-maleic anhydride copolymer or an ethylene methyl methacrylate-maleic anhydride copolymer, or (d)(ii) a silicone-modified polymer obtained by graft-polymerizing a reactive polyorganosiloxane to a thermoplastic resin, or (d)(iii) a mixture of (d)(i) and (d)(ii), and (e) a hydrated metal compound, any of the following processes can be employed.

(1) A process in which the components (a), (b), (c), (d) and (e) are kneaded together.

(2) A process in which at least either one of the components (c) and (d) is added at the time of preparation of the component (b) (a silane-grafted polymer) and, after the preparation of pellet-shaped silane-grafted polymer, the remaining components are added and the mixture is kneaded.

(3) A process in which some components arbitrarily selected from components (a), (b), (c), (d) and (e) are kneaded and then the mixture is kneaded with the remaining components.

When the components (a), (b), (c), (d) and (e) are compounded to produce a composition of the present invention and then the composition is shaped, the following effects can be obtained.

(1) The silane-grafted polymer causes crosslinking without requiring any catalyst. More specifically, hydroxyl groups (—OH) on the surface of the hydrated metal compound and silanol groups (→Si—OH) of the silane-grafted polymer cause a hydrolytic condensation reaction to form strong siloxane linkages [—Si—O—$M_mO_n$ (M is a metal)], under the influences of (a) a small amount of water present on the surface of the hydrated metal compound and (b) the hydrated metal compound which acts similarly to an organic metal compound catalyst and in the presence of frictional heat generated during kneading; in this reaction, no catalyst is required.

(2) The component (c) (a maleic acid or maleic anhydride derivative of a polyethylene, an EVA or an ethylene-α-olefin copolymer) and the component (d)(i) (an ethylene ethyl acrylate-maleic anhydride copolymer or an ethylene-methyl methacrylate-maleic anhydride copolymer) react with the metal ions of the hydrated metal compound to form a complex salt.

The combination use of the component (c) and the component (d)(i) yields striking effect.

(3) The silicone-modified polymer contributes to the improvement of the composition in wear resistance and moldability.

The siloxane linkages formed between the silane-grafted polymer and the hydrated metal compound, and the complex salt linkages formed by the reaction of the maleic acid or maleic anhydride derivative [the component (c)] or the ethylene-ethyl acrylatemaleic anhydride copolymer or ethylene-methyl methacrylate-maleic anhydride copolymer [the component (d)(i)] with the hydrated metal compound [the component (e)] give synergistic effect. This synergistic effect and the effect of the silicone-modified polymer can provide a flame-retardant resin composition with significantly improved resistance against surface deterioration, chemicals, surface damaging, surface whitening on bending, and buckling.

Severe requirements for flame-retardant resin compositions can be met by the synergistic effect of the siloxane linkages and the complex salt linkages and can never be met by either one of the two linkages.

The present composition has combustion-controlling effect quite different from that of the prior art using carbon powders and accordingly can exhibit the combustion-controlling effect irrespective of the kind of various pigments which may be added to the present composition for easier identification in use. Hence, the present composition can be colored in any desired color depending on application purposes The present invention is explained specifically with reference to Examples.

EXAMPLES

First, three silane-grafted olefinic resins (three silane-grafted polymers) were prepared according to the formulations shown in Table 1, using the following procedures. Dicumyl peroxide (DCP) was dissolved in vinyltrimethoxysilane. The solution was independently mixed under agitation with two low-crystalline ethylene copolymers (1) and (2) and a low density polyethylene (3). The resulting silane grafted polymers were extruded at 150°–200° C. using a single-screw extruder of 50 mmφ to obtain silane-grafted polymers A, B and C in a pellet form. Each polymer was placed in an aluminum-laminated bag and the bag was sealed to prevent the influence of external moisture The polymer was taken out by each necessary amount whenever required.

TABLE 1

Formulations used in production of silane-grafted polymers (silane-grafted olefinic resins)

| Materials | Silane-grafted olefinic resins | | |
|---|---|---|---|
| | A | B | C |
| (1) D9052 | 100 | | |
| (2) A2150 | | 100 | |
| (3) G701 | | | 100 |
| DCP | 0.2 | 0.2 | 0.2 |
| Vinyltrimethoxysilane | 3 | 3 | 3 |
| Gel fraction, % by weight* | 57 | 60 | 65 |

(1) Softrex, an ethylene-α-olefin copolymer manufactured by Nippon Petrochemicals Co., Ltd.
(2) Rexlon, an EEA copolymer manufactured by Nippon Petrochemicals Co., Ltd.
(3) A low density polyethylene manufactured by Sumitomo Chemical Co., Ltd.
*Insoluble (% by weight) after immersion in xylene at 120° C. for 20 hours.

Next, various components shown in Tables 2-(i) to 2-(iii) were mixed together in a container. Each of the resulting mixtures was then kneaded in a Banbury roll and pelletized. The pellets were roll-pressed to prepare various test pieces. These test pieces were measured for degree of surface whitening due to formation of magnesium carbonate, weight change when immersed in 10% sulfuric acid (or 3% sodium hydroxide) aqueous solution, resistance to surface damaging, whitening on bending, and flame retardancy in terms of oxygen index.

The above pellets were extruded through an extruder to obtain a tube of 20 mm$\phi$ in outside diameter, 18 mm$\phi$ in inside diameter and 1 mm in thickness, whereby extrudability was measured. Using this tube, buckling was measured.

The results are shown in Tables 2-(i) to 2-(iii). As seen from these Tables, the present compositions (Examples) show remarkable improvements in whitening, resistances to sulfuric acid and sodium hydroxide, resistance to surface damaging, surface whitening on bending, and buckling.

TABLE 2-(i)

| | Components | Examples | | | | | | |
|---|---|---|---|---|---|---|---|---|
| | | 1-(i) | 2-(i) | 3-(i) | 4-(i) | 5-(i) | 6-(i) | 7-(i) |
| (1) | D 9052 | | | 20 | | 80 | | |
| (2) | A 2150 | 70 | | 30 | | | 20 | |
| (4) | CM 1004 | | 50 | 30 | 70 | | | 90 |
| (5) | C 215 | | | | | 5 | | |
| | Silane-grafted olefinic resin A | | 50 | 20 | 30 | | | |
| | Silane-grafted olefinic resin B | 30 | | | | 20 | 80 | |
| | Silane-grafted olefinic resin C | | | | | | | 10 |
| (6) | Admer NF 300 | 3 | | 5 | 3 | | | |
| (7) | N Polymer L 6301 | | 10 | | | 5 | 3 | 3 |
| (8)-(i) | BONDINE FX 8000 | 3 | 10 | 10 | 2 | 2 | 5 | 1 |
| (9) | Aluminum hydroxide | | | | 100 | 100 | | 200 |
| (10) | Magnesium hydroxide | 250 | 150 | 150 | 50 | | 250 | |
| (11) | Lubricant and stabilizer | 1.6 | 1.6 | 1.6 | 1.6 | 1.6 | 1.6 | 1.6 |
| (12) | Pigment | Black | Not used | Black | Black | Not used | Black | Black |
| | Evaluation | | | | | | | |
| (13) | Degree of whitening | Excellent | Excellent | Excellent | Excellent | Excellent | Excellent | Excellent |
| (14) | Weight change by 10% sulfuric acid (wt. %) | −3.8 | −2.1 | −1.5 | −0.9 | −0.5 | −2.5 | −2.3 |
| (15) | Weight change by 3% sodium hydroxide (wt. %) | −0.3 | −0.2 | −0.2 | −0.1 | −0.1 | −0.3 | −0.3 |
| (16) | Resistance to surface scratching | Good | Excellent | Excellent | Excellent | Excellent | Excellent | Good |
| (17) | Whitening on bending | Excellent | Excellent | Excellent | Excellent | Excellent | Excellent | Good |
| (18) | Oxygen index | 35 | 31 | 32 | 32 | 26 | 35 | 33 |
| (19) | Buckling | Excellent | Excellent | Excellent | Excellent | Excellent | Excellent | Good |
| (20) | Extrudability | Good | Excellent | Excellent | Excellent | Excellent | Good | Good |
| (21) | Overall rating | Good | Excellent | Excellent | Excellent | Excellent | Good | Good |

| | Components | Comparative Examples | | | | |
|---|---|---|---|---|---|---|
| | | 1 | 2 | 3-(i) | 4 | 5-(i) |
| (1) | D 9052 | 100 | | | | |
| (2) | A 2150 | | 70 | | | |
| (4) | CM 1004 | | | | 50 | 60 |
| (5) | C 215 | | | 90 | | 20 |
| | Silane-grafted olefinic resin A | | | 10 | 50 | 20 |
| | Silane-grafted olefinic resin B | | 30 | | | |
| | Silane-grafted olefinic resin C | | | | | |
| (6) | Admer NF 300 | | | 10 | | |
| (7) | N Polymer L 6301 | | | | 5 | 30 |
| (8)-(i) | BONDINE FX 8000 | | | 5 | | 5 |
| (9) | Aluminum hydroxide | | | 150 | 100 | |
| (10) | Magnesium hydroxide | 100 | 200 | | | 350 |
| (11) | Lubricant and stabilizer | 1.6 | 1.6 | 1.6 | 1.6 | 1.6 |
| (12) | Pigment | Black | Black | Black | Black | Not used |
| | Evaluation | | | | | |
| (13) | Degree of whitening | Unacceptable | Acceptable | Excellent | Excellent | Good |
| (14) | Weight change by 10% sulfuric acid (wt. %) | −32.0 | −18.2 | −1.8 | −0.7 | −5.3 |
| (15) | Weight change by 3% sodium hydroxide (wt. %) | −3.0 | −1.3 | −0.1 | −0.1 | −5.0 |
| (16) | Resistance to surface scratching | Unacceptable | Unacceptable | Good | Unacceptable | Acceptable |
| (17) | Whitening on bending | Unacceptable | Unacceptable | Acceptable | Excellent | Acceptable |
| (18) | Oxygen index | 26 | 34 | 30 | 24 | 37 |
| (19) | Buckling | Unacceptable | Unacceptable | Acceptable | Good | Acceptable |
| (20) | Extrudability | Good | Excellent | Unacceptable | Excellent | Unacceptable |
| (21) | Overall rating | Unacceptable | Unacceptable | Unacceptable | Unacceptable | Unacceptable |

TABLE 2-(ii)

| | Components | Examples | | | | | | |
|---|---|---|---|---|---|---|---|---|
| | | 1-(ii) | 2-(ii) | 3-(ii) | 4-(ii) | 5-(ii) | 6-(ii) | 7-(ii) |
| (1) | D 9052 | | | 20 | | 80 | | |
| (2) | A 2150 | | 70 | 30 | | | 20 | |
| (4) | CM 1004 | 50 | | 30 | 70 | | | 90 |
| (5) | C 215 | | | | | 5 | | |

TABLE 2-(ii)-continued

|     | Components | | | | | | | |
|-----|-----------|---|---|---|---|---|---|---|
|     | Silane-grafted olefinic resin A | 50 | | 20 | 30 | | | |
|     | Silane-grafted olefinic resin B | | 30 | | | 20 | 80 | |
|     | Silane-grafted olefinic resin C | | | | | | | 10 |
| (6) | Admer NF 300 | | 3 | 5 | 3 | | | |
| (7) | N Polymer L 6301 | 10 | | | | 5 | 3 | 3 |
| (8)-(i) | SP 300 | 10 | 1 | 10 | 4 | 2 | 2 | 5 |
| (9) | Aluminum hydroxide | | | | 100 | 100 | | 200 |
| (10) | Magnesium hydroxide | 150 | 250 | 150 | 50 | | 250 | |
| (11) | Lubricant and stabilizer | 1.6 | 1.6 | 1.6 | 1.6 | 1.6 | 1.6 | 1.6 |
| (12) | Pigment | Not used | Black | Black | Black | Not used | Black | Black |
|     | Evaluation | | | | | | | |
| (13) | Degree of whitening | Excellent | Excellent | Excellent | Excellent | Excellent | Excellent | Excellent |
| (14) | Weight change by 10% sulfuric acid (wt. %) | −2.3 | −4.5 | −1.8 | −1.0 | −0.8 | −3.2 | −2.0 |
| (15) | Weight change by 3% sodium hydroxide (wt. %) | −0.2 | −0.3 | −0.2 | −0.1 | −0.1 | −0.3 | −0.3 |
| (16) | Resistance to surface scratching | Excellent | Acceptable | Excellent | Excellent | Excellent | Good | Good |
| (17) | Whitening on bending | Excellent | Good | Excellent | Excellent | Excellent | Good | Good |
| (18) | Oxygen index | 31 | 35 | 32 | 32 | 26 | 35 | 33 |
| (19) | Buckling | Excellent | Good | Excellent | Excellent | Excellent | Excellent | Excellent |
| (20) | Extrudability | Excellent | Good | Excellent | Excellent | Excellent | Good | Excellent |
| (21) | Overall rating | Excellent | Acceptable | Excellent | Excellent | Excellent | Good | Good |

| | | Comparative Examples | | | | |
|---|---|---|---|---|---|---|
| | Components | 1 | 2 | 3-(ii) | 4 | 5-(ii) |
| (1) | D 9052 | 100 | | | | 60 |
| (2) | A 2150 | | 70 | | | |
| (4) | CM 1004 | | | | 50 | 20 |
| (5) | C 215 | | | 90 | | |
|     | Silane-grafted olefinic resin A | | | 10 | 50 | 20 |
|     | Silane-grafted olefinic resin B | | 30 | | | |
|     | Silane-grafted olefinic resin C | | | | | |
| (6) | Admer NF 300 | | | 10 | | |
| (7) | N Polymer L 6301 | | | | 5 | 30 |
| (8)-(ii) | SP 300 | | | 2 | | 5 |
| (9) | Aluminum hydroxide | | | 150 | 100 | |
| (10) | Magnesium hydroxide | 100 | 200 | | | 350 |
| (11) | Lubricant and stabilizer | 1.6 | 1.6 | 1.6 | 1.6 | 1.6 |
| (12) | Pigment | Black | Black | Black | Black | Not used |
|     | Evaluation | | | | | |
| (13) | Degree of whitening | Unacceptable | Acceptable | Excellent | Excellent | Good |
| (14) | Weight change by 10% sulfuric acid (wt. %) | −32.0 | −18.2 | −3.8 | −0.7 | −7.3 |
| (15) | Weight change by 3% sodium hydroxide (wt. %) | −3.0 | −1.3 | −0.1 | −0.1 | −5.0 |
| (16) | Resistance to surface scratching | Unacceptable | Unacceptable | Good | Unacceptable | Acceptable |
| (17) | Whitening on bending | Unacceptable | Unacceptable | Acceptable | Excellent | Acceptable |
| (18) | Oxygen index | 26 | 34 | 30 | 24 | 37 |
| (19) | Buckling | Unacceptable | Unacceptable | Acceptable | Good | Acceptable |
| (20) | Extrudability | Good | Excellent | Unacceptable | Excellent | Unacceptable |
| (21) | Overall rating | Unacceptable | Unacceptable | Unacceptable | Unacceptable | Unacceptable |

TABLE 2-(iii)

| | | Examples | | | | | |
|---|---|---|---|---|---|---|---|
| | Components | 1-(iii) | 2-(iii) | 3-(iii) | 4-(iii) | 5-(iii) | 6-(iii) |
| (1) | D 9052 | | | 20 | | 80 | |
| (2) | A 2150 | 70 | | 30 | | | 20 |
| (4) | CM 1004 | | 50 | 30 | 70 | | |
| (5) | C 215 | | | | | 5 | |
|     | Silane-grafted olefinic resin A | | 50 | 20 | 30 | | |
|     | Silane-grafted olefinic resin B | 30 | | | | 20 | 80 |
| (6) | Admer NF 300 | 3 | | 5 | 3 | | |
| (7) | N Polymer L 6301 | | 10 | | | 5 | 3 |
| (8)-(i) | BONDINE FX 8000 | 3 | 10 | 10 | 2 | 2 | 5 |
| (8)-(ii) | SP 300 | 1 | 10 | 10 | 2 | 2 | 2 |
| (9) | Aluminum hydroxide | | | | 100 | 100 | |
| (10) | Magnesium hydroxide | 250 | 150 | 150 | 50 | | 250 |
| (11) | Lubricant and stabilizer | 1.6 | 1.6 | 1.6 | 1.6 | 1.6 | 1.6 |
| (12) | Pigment | Black | Not used | Black | Black | Not used | Black |
|     | Evaluation | | | | | | |
| (13) | Degree of whitening | Excellent | Excellent | Excellent | Excellent | Excellent | Excellent |
| (14) | Weight change by 10% sulfuric acid (wt. %) | −3.8 | −2.1 | −1.5 | −0.9 | −0.5 | −2.5 |
| (15) | Weight change by 3% sodium hydroxide (wt. %) | −0.3 | −0.2 | −0.2 | −0.1 | −0.1 | −0.3 |
| (16) | Resistance to surface scratching | Excellent | Excellent | Excellent | Excellent | Excellent | Excellent |
| (17) | Whitening on bending | Excellent | Excellent | Excellent | Excellent | Excellent | Excellent |
| (18) | Oxygen index | 35 | 31 | 32 | 32 | 26 | 35 |
| (19) | Buckling | Excellent | Excellent | Excellent | Excellent | Excellent | Excellent |

TABLE 2-(iii)-continued

| | | | | | | |
|---|---|---|---|---|---|---|
| (20) | Extrudability | Excellent | Excellent | Excellent | Excellent | Excellent | Excellent |
| (21) | Overall rating | Excellent | Excellent | Excellent | Excellent | Excellent | Excellent |

| | | Comparative Examples | | | | |
|---|---|---|---|---|---|---|
| | Components | 1 | 2 | 3-(iii) | 4 | 5-(iii) |
| (1) | D 9052 | 100 | | | | |
| (2) | A 2150 | | 70 | | | 60 |
| (4) | CM 1004 | | | | 50 | 20 |
| (5) | C 215 | | | 90 | | |
| | Silane-grafted olefinic resin A | | | 10 | 50 | 20 |
| | Silane-grafted olefinic resin B | | 30 | | | |
| (6) | Admer NF 300 | | | 10 | | |
| (7) | N Polymer L 6301 | | | | 5 | 30 |
| (8)-(i) | BONDINE FX 8000 | | | 5 | | 5 |
| (8)-(ii) | SP 300 | | | 2 | | 5 |
| (9) | Aluminum hydroxide | | | 150 | 100 | |
| (10) | Magnesium hydroxide | 100 | 200 | | | 350 |
| (11) | Lubricant and stabilizer | 1.6 | 1.6 | 1.6 | 1.6 | 1.6 |
| (12) | Pigment | Black | Black | Black | Black | Not used |
| | Evaluation | | | | | |
| (13) | Degree of whitening | Unacceptable | Acceptable | Excellent | Excellent | Good |
| (14) | Weight change by 10% sulfuric acid (wt. %) | −32.0 | −18.2 | −1.8 | −0.7 | −4.9 |
| (15) | Weight change by 3% sodium hydroxide (wt. %) | −3.0 | −1.3 | −0.1 | −0.1 | −5.0 |
| (16) | Resistance to surface scratching | Unacceptable | Unacceptable | Good | Unacceptable | Acceptable |
| (17) | Whitening on bending | Unacceptable | Unacceptable | Acceptable | Excellent | Acceptable |
| (18) | Oxygen index | 26 | 34 | 30 | 24 | 37 |
| (19) | Buckling | Unacceptable | Unacceptable | Acceptable | Good | Acceptable |
| (20) | Extrudability | Good | Excellent | Unacceptable | Excellent | Unacceptable |
| (21) | Overall rating | Unacceptable | Unacceptable | Unacceptable | Unacceptable | Unacceptable |

Notes for Tables 2-(i) to 2-(iii)
(4) An EMMA manufactured by Sumitomo Chemical Co., Ltd.
(5) A low-density polyethylene manufactured by Sumitomo Chemical Co., Ltd.
(6) A maleic anhydride-grafted polyolefin manufactured by Mitsui Petrochemical Industries, Ltd. MFI = 1.3; density = 0.94; base = an ethylene-α-olefin copolymer.
(7) A maleic anhydride-grafted polyolefin manufactured by Nippon Petrochemicals Co., Ltd. MFI = 0.3; density = 0.92; base = an ethylene-α-olefin copolymer.
(8)-(i) An ethylene-ethyl acrylate-maleic anhydride copolymer manufactured by Sumitomo Chemical Co., Ltd.
(8)-(ii) A silicone-modified polymer manufactured by Dow Corning. Silicon content = 40% by weight; base = a low-density polyethylene.
(9) Higilite H 42M (trade name) manufactured by Showa Denko K. K.
(10) KISUMA 5B (trade name) manufactured by Kyowa Kagaku K. K.
(11) Sanwax 171P manufactured by SANYO CHEMICAL INDUSTRY LTD. 1.0
Irganox 1076 manufactured by Ciba Geigy K. K. 0.3
Sumilizer WXR manufactured by Sumitomo Chemical Co., Ltd. 0.3
(12) A black pigment, VALCAN 9A-32 3.0
(13) A pressed sheet of 5 cm × 5 cm × 1 mm (thickness) was immersed in one liter of distilled water. Thereinto was blown carbon dioxide gas at a rate of 100 ml/min for 48 hours. Then, the sheet was taken out and its degree of whitening due to the formation of magnesium carbonate crystal was observed visually.
(14) The weight change of a test piece when immersed in 10% (by weight) sulfuric acid at 50° C. for 7 days was measured. As the test piece, there was used a JIS No. 3 dumbbell having a thickness of 1 mm.
(15) The weight change of a test piece when immersed in 3% (by weight) sodium hydroxide at 50° C. for 7 days was measured. As the test piece, there was used a JIS No. 3 dumbbell having a thickness of 1 mm.
(16) Resistance to scratching by a pencil of HB hardness was examined visually.
(17) Whitening of a sheet of 2 mm in thickness when bent by 180° was examined visually.
(18) Measured according to JIS K 7201.
(19) Into an extruded tube of 20 mmφ in outside diameter, 18 mmφ in inside diameter, 1 mm in thickness and 300 mm in length, was inserted an electric wire prepared by cladding a copper wire having a diameter of 1 mmφ with a soft polyvinyl chloride composition having a JIS A hardness of 80 in a thickness of 8 mm. The thus obtained test sample was bent around a mandrel of 100 mmφ in outside diameter. The degree of the resulting wrinkles was examined visually.
(20) A single-screw extruder of 50 mmφ was used. 150-160-170-180° C.; L/D = 25, CR = 3.5; extruded tube inside diameter = 18 mmφ; its outside diameter = 20 mmφ.
(21) Excellent > Good > Acceptable > Unacceptable. "Excellent", "Good" and "Acceptable" were taken as "pass".

What is claimed is:

1. A flame-retardant olefinic resin composition comprising
   (a) at least one ethylene copolymer selected from the group consisting of ethylene-α-olefin copolymers, ethylene-ethyl acrylate copolymer and ethylene-methyl methacrylate copolymer,
   (b) a silane-grafted polymer obtained by grafting a silane to an olefinic resin,
   (c) a maleic acid or maleic anhydride derivative of a polyethylene, an ethylene-vinyl acetate copolymer or an ethylene-α-olefin copolymer,
   (d)(i) an ethylene-ethyl acrylate-maleic anhydride copolymer or an ethylene-methyl methacrylatemaleic anhydride copolymer, or (d)(ii) a siliconemodified polymer obtained by graft-polymerizing a reactive polyorganosiloxane to a thermoplastic resin, or (d)(iii) a mixture of (d)(i) and (d)(ii) and
   (e) a hydrated metal compound, wherein there are incorporated the component (c) in an amount of 0.1-30 parts by weight, the component (d)(i) in an amount of 0.1-30 parts by weight when used, the component (d)(ii) in an amount of 0.1-30 parts by weight when used, and the component (e) in an amount of 50-300 parts by weight, all based on 100 parts by weight of the components (a) and (b).

2. A flame-retardant olefinic resin composition according to claim 1, wherein the α-olefin of the ethylene-α-olefin copolymers is selected from the group consisting of propylene, butene-1, pentene-1, hexene-1, heptene-1, octene-1, 4-methylpentene-1, 4-methylhexene-1, 4,4-dimethylpentene-1, nonene-1, decene-1, undecene-1 and dodecene-1.

3. A flame-retardant olefinic resin composition according to claim 1, wherein the olefinic resin to be grafted with a silane is selected from the group consisting of low density polyethylene medium density polyethylene, high density polyethylene ethylene-α-olefin copolymers, ethylene-vinyl acetate copolymer, ethylene-ethyl acrylate copolymer, ethylene-methyl methacrylate copolymer, ethylene-propylene rubber, and ethylene-propylene-diene rubbers.

4. A flame-retardant olefinic resin composition according to claim 1, wherein the silane-grafted polymer is obtained by reacting an olefinic resin with an organic silane represented by the general formula RR'SiY$_2$ wherein R is a monovalent olefinically unsaturated hydrocarbon group; Y is a hydrolyzable organic group; and R' is a monovalent hydrocarbon group other than unsaturated aliphatic hydrocarbon groups or is same as Y, in the presence of a free-radical-generating compound.

5. A flame-retardant olefinic resin composition according to claim 1, wherein the silane-grafted polymer is incorporated in an amount of at least 2 parts by weight per 100 parts by weight of the components (a) and (b).

6. A flame-retardant olefinic resin composition according to claim 1, wherein the crosslinking degree of the silane-grafted polymer is 20–80% by weight in terms of a gel fraction which is defined as a xylene insoluble.

7. A flame-retardant olefinic resin composition according to claim 1, wherein the thermoplastic resin to which a reactive polyorganosiloxane is to be grafted-polymerized, is selected from the group consisting of polyethylene, polypropylene, ethylene-α-olefin copolymers, ethylene-vinyl acetate copolymer, ethyleneethyl acrylate copolymer, ethylene-methyl methacrylate copolymer, polystyrene and acrylonitrile-butadienestyrene copolymer.

8. A flame-retardant olefinic resin composition according to claim 1, wherein the hydrated metal compound is a compound having a decomposition-starting temperature of 150°–450° C. and represented by the general formula M$_m$O$_n$·XH$_2$O, wherein M is a metal; m and n are each an integer of 1 or more determined by the valency of the metal; and X is the number of molecules of bound water, or a double salt containing said compound 9. A flame-retardant olefinic resin composition according to claim 8, wherein the M is selected from the metals of groups IA, IIA, IIB, IIIA, IVA and IVB of the periodic table.

10. A flame-retardant olefinic resin composition according to claim 9, wherein the M is selected from the metals of group IIA of the periodic table.

11. A flame-retardant olefinic resin composition according to claim 9, wherein the M is selected from the metals of group IIIA of the periodic table.

12. A flame-retardant olefinic resin composition according to claim 8, wherein the hydrated metal compound is magnesium oxide monohydrate.

13. A flame-retardant olefinic resin composition according to claim 8, wherein the hydrated metal compound is aluminum oxide trihydrate.

* * * * *